United States Patent Office

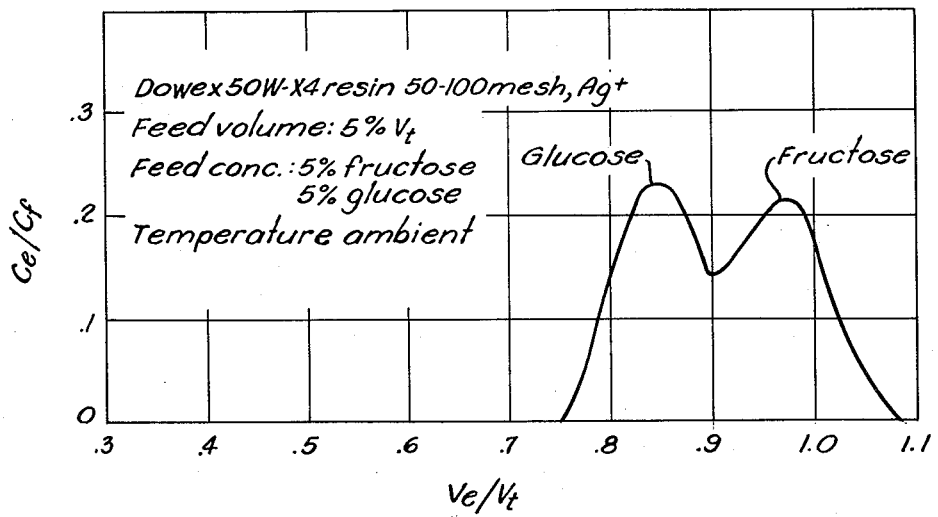

3,044,906
Patented July 17, 1962

3,044,906
SEPARATION OF FRUCTOSE FROM GLUCOSE USING A CATION EXCHANGE RESIN SALT
Leonard J. Lefevre, Midland, Mich., assignor to The Dow Chemical Company, Midland, Mich.
Filed Feb. 15, 1960, Ser. No. 8,606
6 Claims. (Cl. 127—46)

This invention concerns an improved method for separating fructose from glucose wherein certain silver salts of cation exchange resins are used as separating media.

Until the present invention, it was never thought possible to separate sugars which are functional isomers by means of salts of cation exchange resins as selective absorbents. This was because such molecules are non-ionic in nature and have the same molecular weight. Furthermore, it was not apparent from the knowledge of ion exclusion techniques that such a separation would be feasible.

Pursuant to this invention, it has been discovered that fructose can be separated from its aqueous solutions also containing glucose by contacting an aqueous solution of fructose and glucose with a silver salt of a strongly acid nuclearly-sulfonated styrene-type cation exchange resin. The fructose and glucose are thereby retained by the resin, the fructose being held more firmly than the glucose. Thereafter, a water wash, advantageously distilled or deionized water, is used to elute first the glucose which is more loosely retained by the resin, then the fructose which is more firmly retained by the resin.

Aqueous solutions of fructose and glucose which can be separated into fructose and glucose fractions by the process of this invention advantageously contain from about 10 to about 40 weight percent of total sugars. The solutions of sugars to be separated need not contain fructose and glucose only. Advantageously, commercial aqueous solutions obtained by inverting sucrose and containing fructose, glucose and sucrose are separated into a glucose-sucrose fraction, the sucrose being eluted together with the glucose, and a fructose fraction. The remaining sucrose can be inverted and the fructose and glucose recycled for further separation.

The silver salts of strongly acid nuclearly-sulfonated cation exchange resins used in the practice of this invention are those having an at least slightly cross-linked vinyl-aromatic resin matrix. They are nuclearly-sulfonated polymers or copolymers of vinylaromatic compounds, such as styrene, ar-vinyltoluene, or ar-vinylxylene, etc., that have been cross-linked, in molecular structure, to an extent rendering the sulfonated polymers and copolymers insoluble in aqueous solutions of acids, bases, or salts. They may be cross-linked in any of a number of known ways. For instance, polystyrene granules can be given a cross-linked molecular structure by being subjected to an electron bombardment to render them cross-linked and insoluble and can thereafter be sulfonated and be converted to the silver salt to obtain a suitable cation exchange resin. The cross-linking is usually accomplished by copolymerizing a major amount of one or more monovinylaromatic compounds with a minor proportion, e.g., from about 0.5 to 8 weight percent of a polyethylenecially-unsaturated organic cross-linking agent, e.g., divinylbenzene, divinyltoluenes, divinylnaphthalenes, diallyl esters, doubly-unsaturated esters such as ethylene glycol diacrylate and ethylene glycol dimethylacrylate, etc., and the resulting cross-linked copolymers are sulfonated. These and other ways of making sulfonated, cross-linked vinylaromatic polymeric products having ion exchange properties are known in the art. For convenience, such insoluble, sulfonated, cross-linked vinylaromatic resins, having cation-exchanging properties, will hereinafter be referred to generically as "nuclearly sulfonated styrene cation exchange resins." The silver salts of nuclearly sulfonated copolymers of from 98 to 92 weight percent of styrene, or a mixture of styrene and ethylvinylbenzene, and from 2 to 8 (usually from 1 to 4) weight percent of divinylbenzene, are preferably employed in the process of the invention.

The temperatures used in the separation are not critical, and may be varied within a range advantageously of from about 20° to about 80° C. The preferred temperature range is from about 30° to about 50° C.

In practice, an aqueous solution of fructose and glucose is contacted with a silver salt of a nuclearly-sulfonated styrene cation exchange resin, advantageously by feeding the sugar solution to a water-immersed bed of the cation exchange resin salt, whereby the resin is loaded with fructose and glucose, the glucose is removed by washing the loaded resin with a first water wash and thereafter the fructose is removed by a second water wash. These two washes can be accomplished by a single passage of water through a bed of the resin, in which case a solution of the glucose, or glucose together with sucrose, is obtained as an early fraction of the resulting effluent liquor and a solution of fructose is obtained as a subsequent fraction of the effluent liquor. In some instances, an intervening fraction containing both glucose and fructose is also obtained. In such instances, the intervening fraction can be returned to the ion exchange resin bed in a subsequent operating cycle of the process. After the ion exchange resin bed has been eluted with water, it is in condition for reemployment in the process. The operating cycle just described may be, and usually is, repeated many times, fresh portions of the starting solution comprising fructose and glucose being fed to the bed in successive cycles. In case part of the silver initially present in the ion exchange resin becomes displaced by other ions present in the starting solution of the sugars during prolonged practice of the process, the process may be interrupted occasionally and the resin be reloaded with silver ions, e.g., by a conventional ion exchange operation such as treatment of the resin with an aqueous solution of an ionizable silver salt, e.g., $AgNO_3$.

The process of this invention makes possible the complete separation of fructose from an aqueous solution of fructose and glucose and the complete separation of fructose from an aqueous solution of fructose, glucose and sucrose. Overall yields of 90 percent and higher are attainable, theoretical fructose basis.

The process can advantageously be carried out in a continuous, or pseudo-continuous, manner utilizing a Higgins contactor (Higgins and Roberts, "A Countercurrent Solid-Liquid Contactor for Continuous Ion Exchange," Chemical Engineering Progress Symposium Series, No. 14, volume 50, 1954, pages 87–92, and U.S. Patent 2,815,322), in which case cyclic loading and eluting procedures or batch process loading and eluting procedures may be used. In either of the above-mentioned procedures, depending upon the temperatures, concentrations and viscosities of the sugar solutions, the feed flow and elution rates are varied as desired, advantageously between about 0.05–0.5 g.p.m./ft.$^2$, largely dictated by economic considerations. A simple test suffices to determine the adequacy of a proposed feed flow or elution rate. Effluent and eluate concentrations and changes therein are advantageously determined and followed by refractive index measurements.

The following descriptive example is given in illustration and not in limitation of the invention.

EXAMPLE 1

Fructose was separated from glucose on a column of the silver form of cation exchange resin, Dowex 50W–X4 type, 50–100 mesh, a sulfonated copolymer of 92 weight percent styrene, 4 percent ethylvinylbenzene and 4 percent divinylbenzene, at a bed depth of four feet, a flow rate of 0.1 g.p.m./ft.$^2$ of column cross section, a feed-liquor loading of 5 percent of bed volume and at solution concentrations of 5 weight percent fructose and 5 weight percent glucose. This was accomplished by passing an aqueous solution of the sugars downflow through a water-immersed bed of the cation exchange resin in the silver salt form to displace a corresponding volume of effluent liquor and thereafter eluting absorbed sugars with water. Successive eluate fractions containing glucose and fructose, respectively, were collected and analyzed. The table is a listing of the data points for this separation. These data are graphed as accompanying FIGURE 1.

*Table I*

| | Ve/Vt [1] | Ce/Cf [2] |
|---|---|---|
| g.[3] | .753 | 0 |
| | .790 | .085 |
| | .827 | .213 |
| | .864 | .213 |
| | .884 | .192 |
| | .902 | .138 |
| | .920 | .160 |
| | .938 | .181 |
| f.[4] | .975 | .213 |
| | 1.01 | .138 |
| | 1.05 | .064 |

[1] Ve/Vt = Vol. of eluate/vol. of resin.
[2] Ce/Cf = Conc. of eluate/Conc. of feed (weight percent).
[3] g. = glucose.
[4] f. = fructose.

EXAMPLE 2

The procedure of Example 1 was repeated, using a column of the same resin salt in the form of a 100 ml. bed ½ inch in diameter with a feed concentration of 5 weight percent fructose, 5 percent glucose and 10 percent sucrose. Other conditions were the same. Table II lists the data points for this separation.

*Table II*

| | Ve/Vt | Ce/Cf |
|---|---|---|
| s.[1] and g. | .66 | 0.009 |
| | .69 | 0.018 |
| | .72 | 0.041 |
| | .75 | 0.069 |
| | .78 | 0.138 |
| | .81 | 0.174 |
| | .84 | 0.203 |
| | .87 | 0.210 |
| | .90 | 0.192 |
| | .93 | 0.179 |
| s., g. and f. (to recycle) | .96 | 0.156 |
| | .99 | 0.133 |
| | 1.02 | 0.119 |
| | 1.05 | 0.101 |
| | 1.08 | 0.092 |
| f. | 1.11 | 0.073 |
| | 1.14 | 0.060 |
| | 1.17 | 0.027 |
| | 1.20 | 0.018 |
| | 1.23 | 0 |

[1] Sucrose

I claim:
1. A method for separating fructose from an aqueous solution of fructose and glucose which comprises contacting said aqueous solution with a silver salt of a nuclearly-sulfonated styrene cation exchange resin cross-linked in molecular structure to an extent rendering the sulfonated resin insoluble in aqueous solutions of acids, bases and salts whereby fructose and glucose are absorbed by said cation exchange resin salt, separating the loaded resin from the remaining aqueous solution and eluting said loaded resin with water to remove the glucose and fructose in successive fractions of eluate.

2. The method of claim 1 wherein the total sugar concentration of the feed solution is between about 10 and about 40 weight percent.

3. The method of claim 1 wherein the nuclearly-sulfonated styrene cation exchange resin salt is that of a copolymer of a preponderance of styrene and from about 0.5 to about 8 weight percent of divinylbenzene.

4. A method for separating fructose from an aqueous solution of fructose, glucose and sucrose which comprises contacting said aqueous solution with a silver salt of a nuclearly-sulfonated styrene cation exchange resin cross-linked in molecular structure to an extent rendering the sulfonated resin insoluble in aqueous solutions of acids, bases and salts whereby fructose, glucose and sucrose are absorbed by said cation exchange resin salt, separating the thereby loaded resin from the remaining aqueous solution and eluting said loaded resin with water to remove the glucose and sucrose in one fraction of the eluate and the fructose in another fraction of the eluate.

5. A method for separating fructose from an aqueous solution of fructose and glucose, the total sugar concentration of which is between about 10 and about 40 weight percent, which comprises feeding such solution to a water-immersed column of a silver salt of a nuclearly-sulfonated styrene cation exchange resin cross-linked in molecular structure to an extent rendering the sulfonated resin insoluble in aqueous solutions of acids, bases and salts whereby the water of the water-immersed resin is displaced by a corresponding volume of said sugar solution and whereby the resin column is loaded with glucose and fructose, and eluting said loaded resin column with water to displace eluate fractions of glucose and fructose respectively.

6. A method for separating fructose from an aqueous solution of fructose, glucose, and sucrose, the total sugar concentration of which is between about 10 and about 40 weight percent, which comprises feeding such solution to a water-immersed column of a silver salt of a nuclearly-sulfonated styrene cation exchange resin cross-linked in molecular structure to an extent rendering the sulfonated resin insoluble in aqueous solutions of acids, bases and salts whereby the water of the water-immersed resin is displaced by a corresponding volume of said sugar solution and whereby the resin column is loaded with glucose, sucrose and fructose and eluting said loaded resin column with water to displace an eluate fraction of both glucose and sucrose and an eluate fraction of fructose.

References Cited in the file of this patent

UNITED STATES PATENTS

| 2,868,677 | Kopke | Jan. 13, 1959 |
| 2,890,972 | Wheaton | June 16, 1959 |

OTHER REFERENCES

Synthetic Ion Exchangers, by Osborn, 1955, pp. 53–63.

Ion Exchangers in Organic and Biochemistry, by Calman and Kressman, Interscience Publishers, Inc., New York, N.Y., 1957, pp. 178–187.

Ion Exchange Resins, by Kunin, John Wiley and Sons, Inc., New York, N.Y., 2nd Edition, 1958, pp. 298–300.